(12) United States Patent
Vu

(10) Patent No.: US 10,862,358 B2
(45) Date of Patent: Dec. 8, 2020

(54) MAGNETICALLY GEARED DC BRUSHLESS MOTOR USING SEPARATE WINDING SECTIONS

(71) Applicant: Khoa Vu, San Diego, CA (US)

(72) Inventor: Khoa Vu, San Diego, CA (US)

(*) Notice: Subject to any disclaimer, the term of this patent is extended or adjusted under 35 U.S.C. 154(b) by 318 days.

(21) Appl. No.: 15/874,803

(22) Filed: Jan. 18, 2018

(65) Prior Publication Data

US 2018/0233990 A1 Aug. 16, 2018

Related U.S. Application Data

(60) Provisional application No. 62/447,853, filed on Jan. 18, 2017.

(51) Int. Cl.
*H02K 1/27* (2006.01)
*H02K 1/14* (2006.01)
(Continued)

(52) U.S. Cl.
CPC ........... *H02K 1/2793* (2013.01); *H02K 1/148* (2013.01); *H02K 3/02* (2013.01); *H02K 3/18* (2013.01); *H02K 3/28* (2013.01); *H02K 3/522* (2013.01); *H02K 7/125* (2013.01); *H02K 11/33* (2016.01); *H02K 15/0062* (2013.01); *H02K 15/022* (2013.01); *H02K 15/095* (2013.01); *B64C 39/024* (2013.01); *B64C 2201/024* (2013.01); *B64C 2201/042* (2013.01);
(Continued)

(58) Field of Classification Search
CPC ...... H02K 49/102; H02K 1/182; H02K 11/33; H02K 7/125; H02K 1/148; H02K 1/2793; H02K 3/02; H02K 3/18; H02K 3/522; H02K 15/022; H02K 15/095; H02K 15/0062; H02K 3/28; H02K 29/08; H02K 11/215; H02K 2203/06; B64C 2201/024; B64C 39/024; B64C 2201/042
See application file for complete search history.

(56) References Cited

U.S. PATENT DOCUMENTS 5,440,185 A * 8/1995 Allwine, Jr. ............. G01B 7/30
310/114
5,578,880 A * 11/1996 Lyons ................. F16C 32/0442
310/90.5
(Continued)

*Primary Examiner* — Quyen P Leung
*Assistant Examiner* — Alexander A Singh
(74) *Attorney, Agent, or Firm* — Emilio Cazares

(57) ABSTRACT

Embodiments of the disclosure provide a magnetically geared DC brushless motor and method of using the same. The motor may use multiple separately terminable winding sections wrapped around motor armatures. At least one of the separately terminable winding sections may have windings around adjacent armatures. The motor may be configured to activate certain winding sections to control the velocity and torque outputs of the motor. The winding sections may include copper wire, and the separate winding sections may have wires of different gauge sizes. Various winding sections may be powered by separate voltage sources. Various winding sections may be powered by separate pulse-width modulation voltage sources. The motor may be configured to increase and/or decrease the voltage of a winding section or combination of sections to prepare for the activation or deactivation of another winding section or combination of winding sections.

20 Claims, 12 Drawing Sheets

(51) Int. Cl.
   *H01K 3/02*      (2006.01)
   *H02K 7/12*      (2006.01)
   *H02K 3/02*      (2006.01)
   *H02K 3/18*      (2006.01)
   *H02K 3/52*      (2006.01)
   *H02K 15/02*     (2006.01)
   *H02K 15/095*    (2006.01)
   *H02K 15/00*     (2006.01)
   *H02K 11/33*     (2016.01)
   *H02K 3/28*      (2006.01)
   *B64C 39/02*     (2006.01)
   *H02K 11/215*    (2016.01)
   *H02K 29/08*     (2006.01)

(52) U.S. Cl.
   CPC ............ *H02K 11/215* (2016.01); *H02K 29/08* (2013.01); *H02K 2203/06* (2013.01)

(56) References Cited

U.S. PATENT DOCUMENTS

2004/0145266 A1* 7/2004 Gladkov ................ H02K 3/28
                                                    310/180
2013/0093271 A1* 4/2013 Luke .................... H02K 16/04
                                                    310/58
2013/0221798 A1* 8/2013 Neet ..................... H02K 1/22
                                                    310/263

\* cited by examiner

MAGNETICALLY GEARED DC BRUSHLESS MOTOR USING SEPARATE WINDING SECTIONS

CROSS-REFERENCE

This non-provisional utility patent application claims priority to the earlier filed Provisional Application No. 62/447,853, filed on Jan. 18, 2017, the entirety of which is incorporated herein by reference.

BACKGROUND

Permanent magnet brushless motors may be used to supply motive power to a variety of systems, including electric vehicles and drone aircrafts. These systems can perform in varying environments, in which the motor may at times operate at relatively higher speeds or carry relatively heavy loads, as the case may be. It is therefore desirable for permanent magnet brushless motors to be able to change their torque and speed outputs to satisfy performance requirements. By way of example, some automobiles have confronted this issue by implementing mechanical gears to accomplish a variety of torque and speed outputs. This solution, however, tends to be costly, inefficient, and impractical in the electrical motor industry, which demands efficiency, reduced weight, and size.

Switches may be used to change a motor's circuitry and thus depart from the typically linear, fixed nature of the relationship between torque and speed characteristics. These methods introduce several problems. One problem is that switch failure may cause the motor to short circuit. Additionally, there is typically a brief inactivity period between switching states, which causes a delay in the motor's operation between states. Benefits that may be associated with rapidly switching between different states to achieve intermediate effects, however, may be limited by the speed at which the circuitry can switch from one state to another. Finally, the circuitry of the windings can be changed in a variety of configurations to yield a variety of motor characteristics, but each variation is typically powered by the same voltage supply. This limits a motor's ability to access a higher supply voltage for acceleration purposes.

BRIEF SUMMARY OF THE DISCLOSURE

In view of the above-described and other shortcomings in conventional DC brushless motors, there exists a need for direct current brushless motors capable of variable torque and speed characteristics by switching between separately terminable winding sections. In particular, there exists a need for a brushless motor with multiple layers of separately terminable winding sections, where the motor is capable of switching between the separate winding sections in order to achieve desired torque and speed outputs.

The present disclosure relates generally to electric motors. More particularly, the present disclosure relates to a magnetically geared brushless motor capable of switching between separately terminable winding sections, for example, to achieve desired torque and speed outputs during the operation of the motor.

The present disclosure provides a brushless motor with multiple layers of separately terminable winding sections, where the motor is capable of switching between the separate winding sections in order to achieve desired torque and speed outputs. In one or more aspects of the present disclosure, a brushless direct current motor includes a plurality of armatures mounted to a stator. The motor also includes a plurality of separately terminable winding sections. Each of the winding sections is wrapped around at least one of the armatures, and at least one of the winding sections includes a winding wrapped around two or more adjacent armatures of the plurality of armatures. The motor further includes a plurality of electronic switch devices. Each of the electronic switch devices is connected to at least one of the winding sections. In certain implementations of these one or more aspects, which may be generally applicable but are also particularly applicable in connection with any other implementation herein, the electronic switch devices are separately terminable.

BRIEF DESCRIPTION OF THE DRAWINGS

Further aspects of the present disclosure will be more readily appreciated upon review of the detailed description of the various disclosed embodiments, described below, when taken in conjunction with the accompanying figures.

DETAILED DESCRIPTION

Figure 1:
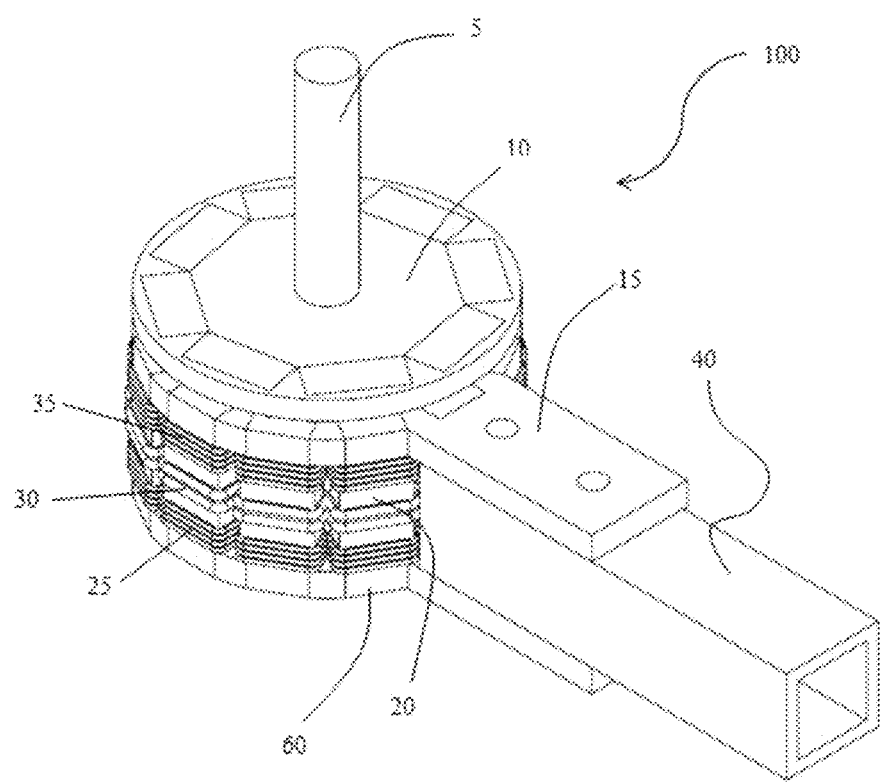
FIG. 1 depicts an example motor in connection with embodiments of the present disclosure.

Embodiments of the present disclosure are directed to a method and device for a magnetically geared direct current brushless motor capable of achieving desired torque and speed characteristics contemporaneously while the motor is in operation. In various deployments described herein, the disclosure involves a direct current brushless motor with multiple separately terminable winding sections wound around the motor armatures. The separately terminable winding sections are activated, either individually, simultaneously, or in a combination thereof, to control the motor velocity constant ($K_v$) of the motor. The device may be configured in terms of one or more of materials, characteristics, sizes, orientations, and attachment features, such that efficiency may be increased and the torque and speed characteristics of the motor may be made suitable for an intended purpose depending on varying environmental/loading conditions and/or use of the motor.

In embodiments of the disclosure, permanent magnet brushless motors may include multiple armatures mounted around, for example, a circular stator. Copper windings may be wound around the armatures and may act as electromagnets upon being energized with electrical current. An electronic switch controller may receive a direct current signal and transform it in to a three-phase electrical signal to selectively energize a given phase of connected copper windings. As a given phase of copper windings is energized, the copper phase of copper winding may act as a magnetic pole, motivating the permanent magnet to turn towards the magnetic pole. The electronic switch controller may then switch phases, for example, by turning off the energized phase of copper windings and turning on the next phase of adjacent copper windings. This may further motivate the permanent magnet rotor to turn towards the next phase of copper windings. This process may be iterated rapidly in some cases, and for relatively long periods, through the three phases of copper windings to create constant rotational motion of the rotor.

Permanent magnet brushless motors, according to embodiments of the present disclosure, may generally exhibit linear torque and speed characteristics. The rotation of the permanent magnet rotor relative to the copper windings may produce a voltage counter to the supply voltage in proportion to the rotor's rotational speed. This counter-electromotive force, or back EMF, may increase as the speed of the motor increases. The torque output of a permanent magnet brushless motor is in some cases at a maximum when it is loaded to the point where it is unable to rotate because there is no back electro-magnetic field (EMF). Conversely, the torque output of a permanent magnet brushless motor is in some cases at a minimum when it rotates freely without any load, because the back EMF is at a maximum. The generally linear relationship between a motor's speed and torque characteristics may be described by the motor velocity constant, $K_v$. Certain design parameters of a permanent magnet brushless motor can be modified in accordance with teachings present disclosure, to control the effective $K_v$. In embodiments, these parameters include the number of loops of wire around an armature, the gauge of wire, and the number of armatures wound with copper windings, or poles. As the number of poles increases, the torque capabilities of the motor may be increased, for example, due to increased magnetic flux. As the number of poles decreases, the motor may be able to achieve higher speeds, in some cases at the expense of torque capabilities.

The details of some example embodiments of the methods and devices of the present disclosure are set forth in this description and in some cases, in other portions of the disclosure. Other features, objects, and advantages of the disclosure will be apparent to one of skill in the art upon examination of the present disclosure, description, figures, examples, and claims. It is intended that all such additional methods, devices, features, and advantages be included within this description (whether explicitly or by reference), be within the scope of the present disclosure, and be protected by one or more of the accompanying claims.

FIG. 1 is a diagram of an example embodiment of the disclosure depicting brushless permanent magnet motor 100 with three separately terminable winding sections, 25, 30, and 35. Motor armature 20, along with the plurality of armatures around motor 100, may be fixed to base plate 60 and mounted vertically to motor stator 15. In this illustration, the motor is fixed to attachment arm 40. By way of example, this arrangement may be suitable for using motor 100 as a single rotor on a drone copter aircraft. It will be appreciated, however, that motor 100 may be attached, fixed, or constrained in any configuration suitable for an intended purpose. Separately terminable winding sections 25, 30, and 35 are shown as being arranged vertically relative to one another. Separately terminable winding section 25 (shown for example as a bottom section in FIG. 1), separately terminable winding section 30 (shown for example as a middle section in FIG. 1), and separately terminable winding section 35 (shown for example as a top section in FIG. 1), each include multiple windings wound around the plurality of armatures. In embodiments, it will be appreciated that the present disclosure includes various geometries and configurations of motor 100, for example, outrunner, inrunner, and so on.

Figure 2A:
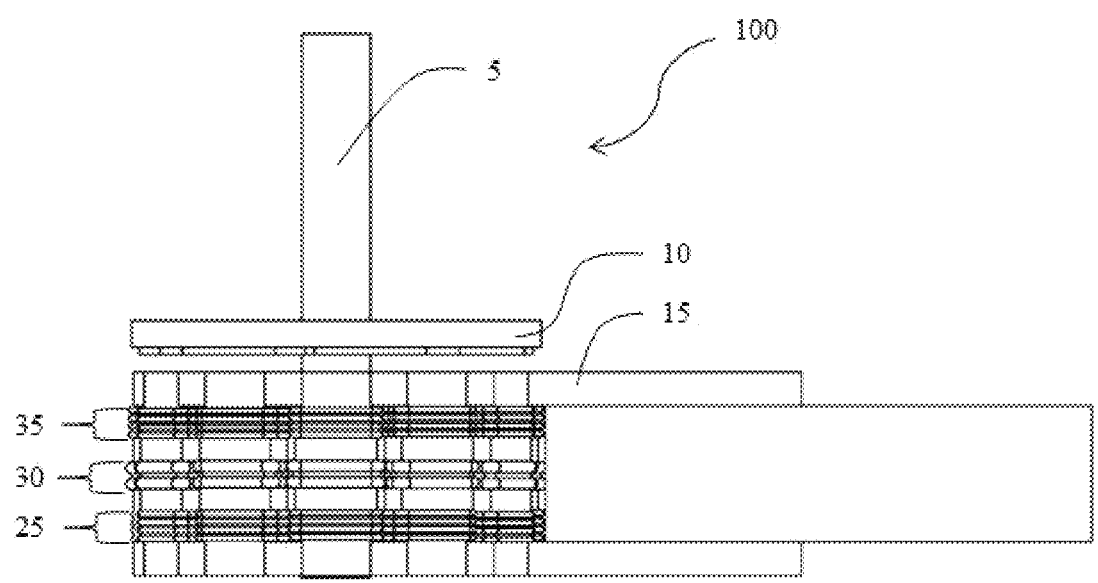
FIG. 2A depicts a side view of an example motor in connection with embodiments of the present disclosure.
Figure 8:
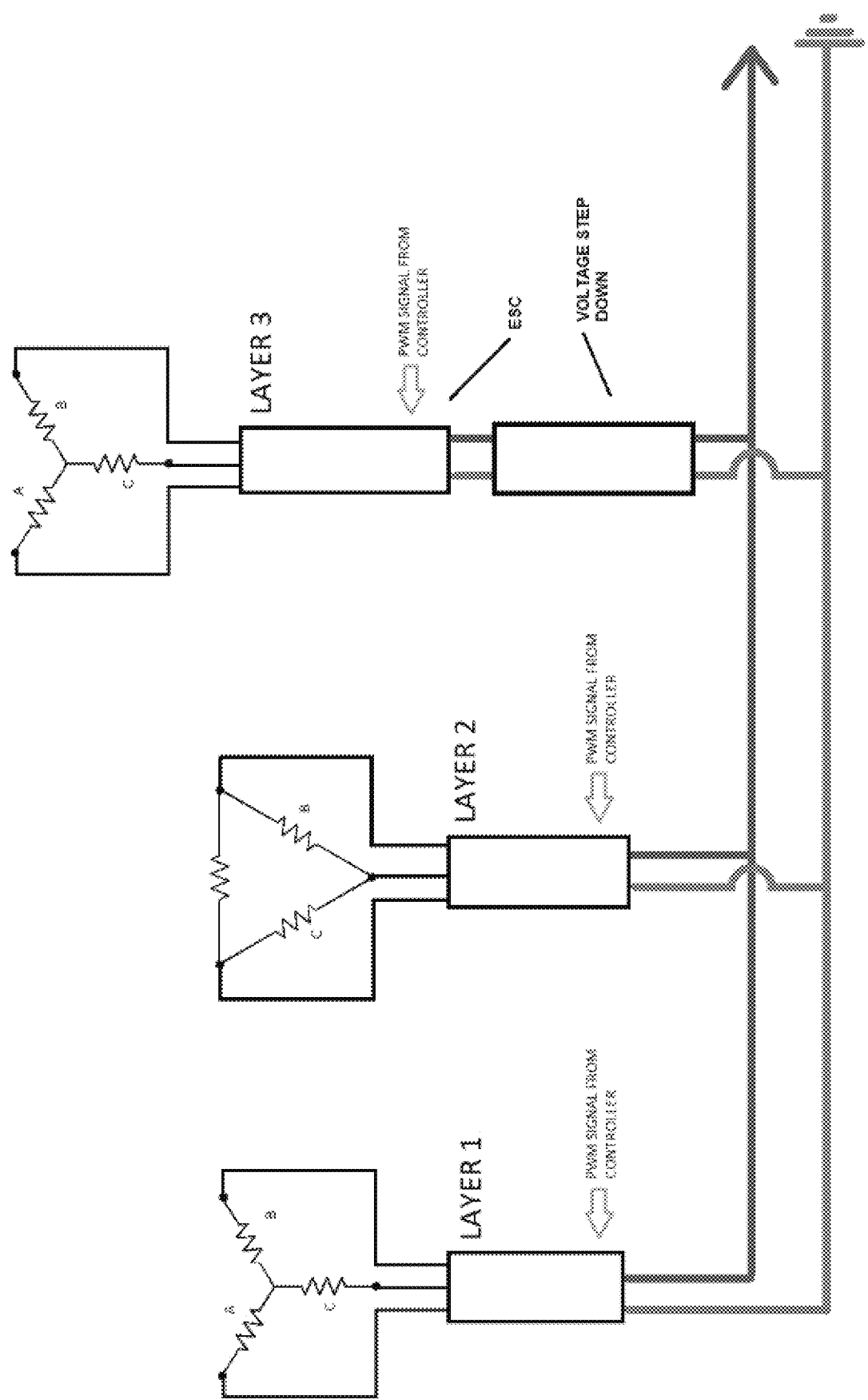
FIG. 8 is a schematic diagram of an example magnetically geared DC brushless motor using separately terminable winding sections, consistent with disclosed herein.

FIG. 2A shows that, for example, each horizontal winding section of the motor 100 may be separate and distinct from the other sections. Winding section 30 (middle) may have a relatively larger wire gauge and a relatively lesser number of windings around the armatures in some cases. In embodiments, this may provide winding section 30 with different output characteristics than, for example, winding sections 25 and/or 35. Winding sections 25, 30, and 35 as shown in figures of the present disclosure, may be visibly separated in order to demonstrate that they are independent of one another. Upon studying the present disclosure, however, one of skill in the art will appreciate that there is no requirement that winding sections 25, 30, and/or 35 be physically separated from each other in any particular way. Nevertheless, each winding section 25, 30, 35 may typically be its own electrical circuit that may be independent (e.g., from an electrical perspective) of the other winding sections. For example, with reference to FIG. 8, each winding section 25, 30, 35 may in some cases receive a separate supply voltage. This may be done, in some cases, using a separate circuit for one or more of winding sections 25, 30, and/or 35 to present independent and/or different voltages winding sections 25, 30, and/or 35. In some cases, a single such circuit may drive more than one winding section 25, 30, and/or 35 with the same (electrically coupled) line. In embodiments, a single such circuit may be used to generate more than one independent and/or different voltage to respectively drive winding sections 25, 30, and/or 35. In embodiments, a pulse-width modulation (PWM) circuit may be coupled on the one hand to the output of a voltage step down circuit and on the other hand to one or more of winding sections 20, 25, and/or 30.

In embodiments, the voltage supply line may be coupled to the PWM circuit driving one or more of the winding sections (e.g., winding sections 20 and 25), while the voltage supply line may also be coupled (e.g., in parallel) to other of the winding sections (e.g., winding section 30) through a voltage step down circuit. In some cases, the modification to the voltage supply source effected by the (e.g., step down) circuit(s) may be made variable, adaptable, and/or configurable, such that the voltage supplied to one or more winding section may be modified on the fly, including in some cases relative to the other winding sections. In some of these instances, the thickness of a particular winding section may be configured for the winding section to operate on a particular supply voltage or range of supply voltages. Thus, in example implementations, the embodiments provided in FIG. 8 and described with reference thereto, as well as additional embodiments described herein, may improve a motor's ability to access a different supply voltages (e.g., for acceleration purposes). Additionally, FIG. 2A illustrates a small air gap that may be present between permanent magnet rotor 10 and stator 15. This air gap may allow for free rotation motion of the rotor. As rotor 10 spins, rotor 10 may transmit rotational energy to motor shaft 5.

Figure 2B:
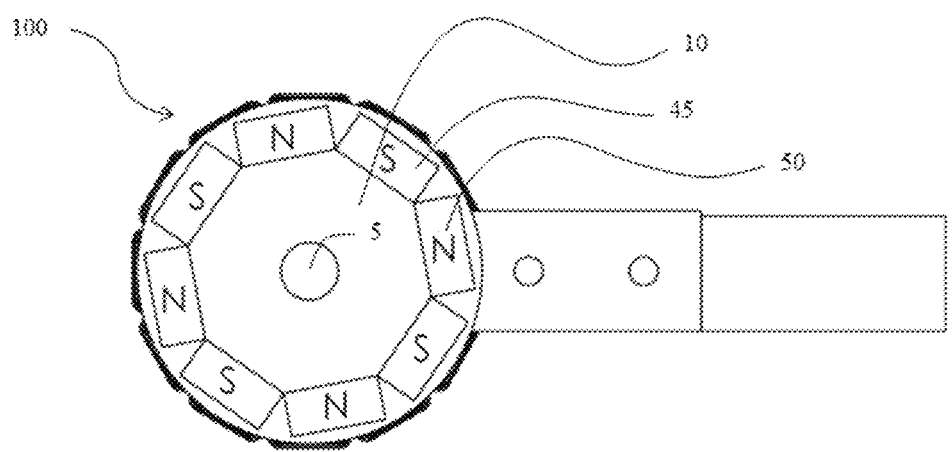
FIG. 2B depicts a top view of an example motor in connection with embodiments of the present disclosure.

FIG. 2B is illustrates example embodiments involving motor 100, and in particular depicts a top view of permanent magnet rotor 10 and motor shaft 5. Rotor 10 may include permanent magnets that alternate in polarity. For example, permanent magnet 45 may be a south magnetic pole, and adjacent permanent magnet 50 may be a north magnetic pole. The polarity of the permanent magnets 45, 50, etc. may alternate around rotor 10. The number, size, strength, and orientation of permanent magnets 45, 50, etc. fixed to rotor 10 in some cases depends on at least the number armatures, and particular configuration of multiple separate winding sections, and/or the intended use of the motor.

Figure 3:
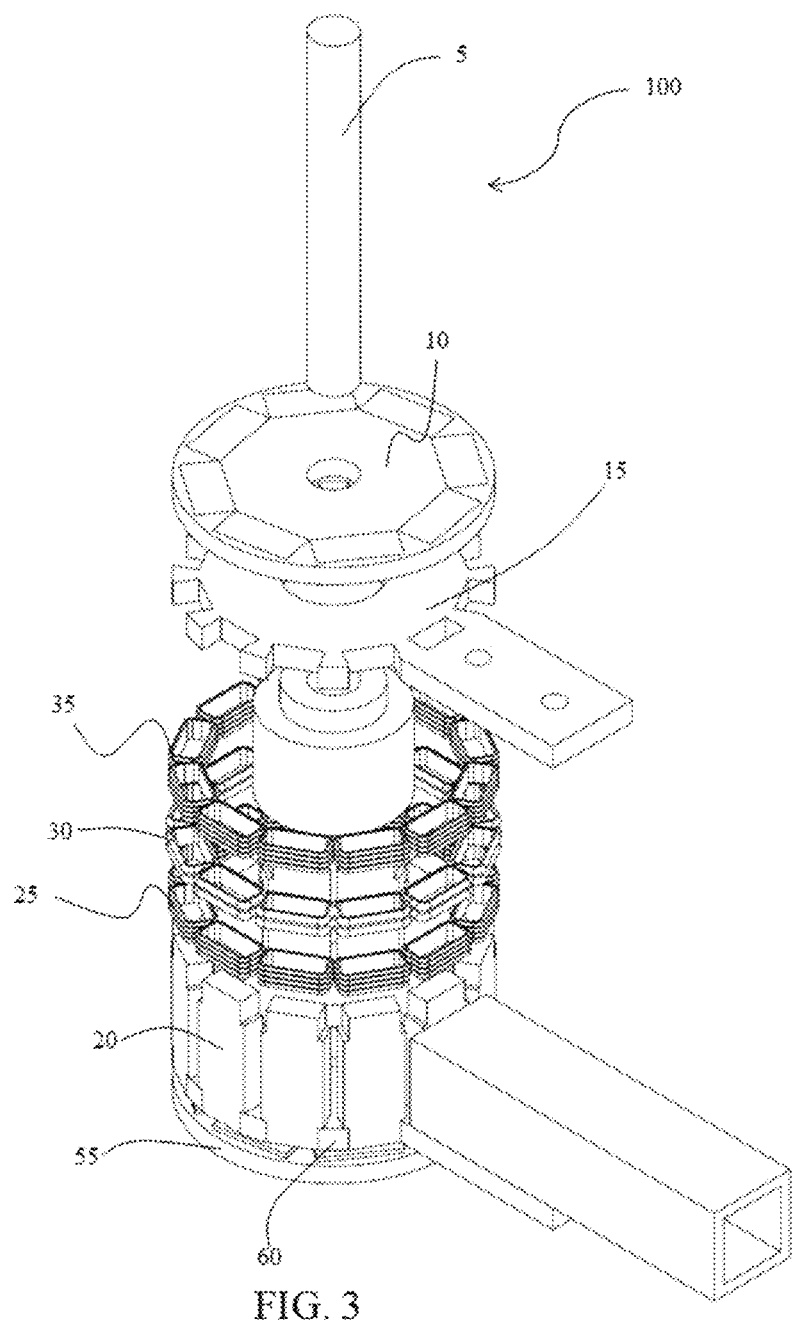
FIG. 3 depicts an exploded assembly of an example motor in connection with embodiments of the present disclosure.

The assembly of motor 100 in accordance with example embodiments is shown in FIG. 3, which further illustrates armature 20, along with an array of what in some cases may be similar armatures, mounted to base plate 60. Separate winding sections 25, 30, and 35 may be wrapped (e.g., horizontally) around armatures 20 and arranged vertically relative to one another. Each winding section 25, 30, and 35 may include horizontal windings around each of the plurality of armatures 20. Winding sections 25, 30, and 35 may also be wound vertically, at an angle, or in any other orientation depending on the performance conditions and needs of a particular motor application.

Bottom winding section 25 is further from permanent magnet rotor 10 relative to middle winding section 30 and top winding section 35. Accordingly, bottom winding section 25 may have less of an interaction with the magnetic fields that may be present in conjunction with the permanent magnets (e.g., 45, 50, etc.) fixed on rotor 10. In some cases, an optional bottom rotor 55, which in some cases may be substantially similar or identical to the top rotor 10, may be mounted and fixed to transmit rotational energy to shaft 5. In embodiments, rotors 10 and 55 may be mounted vertically on both sides of winding sections 25, 30, and 35. In example implementations, any other orientation may be used with respect to rotors 10 and/or 55, including, but not limited to an in-runner orientation, where rotor 10 and/or 55 is within the core of winding sections 25, 30, and/or 35, or an out-runner orientation, where rotor 10 and/or 55 surrounds the outside of the winding sections 25, 30, and/or 35.

Figure 4A:
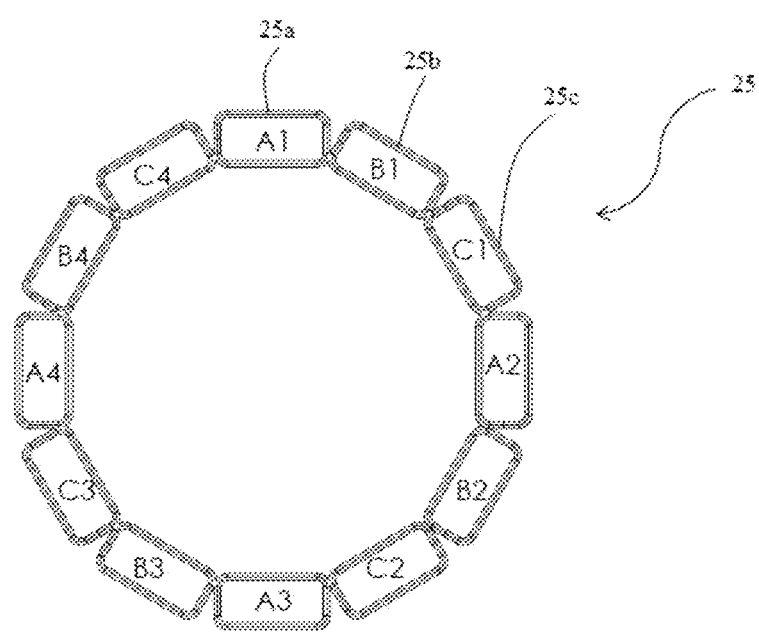
FIG. 4A depicts an example winding configuration of a bottom winding section in connection with embodiments of the present disclosure.

FIG. 4A depicts an example winding configuration of bottom winding section 25 (with reference by way of example to FIG. 2A). Winding section 25 in this case includes three phases, A, B, and C, identified in FIG. 4A as 25a, 25b, and 25c, respectively. Each of phases 25a, 25b, and 25c may involve a number of distinct coils wrapped around one or more armatures. For example, phases 25a, 25b, and/or 25c may involve windings of four coils of enameled copper wire wound around four of the motor armatures. In the example shown in FIG. 4A, phase 25a includes windings of the four coils, A1, A2, A3, and A4. Each of coils (e.g., A1-A4) of a given phase may be separated by two coils of the other two phases. For example, the coils of phase 25a (e.g., A1-A4) are shown in FIG. 4A to be separated by one coil of phase 25b (e.g., B1-B4) and one coil of phase 25c (e.g., C1-C4). When a given phase 25a, 25b, and/or 25c is energized by an electronic switch controller, each of the phase's coils may act as an electromagnet, exerting magnetic force on a permanent magnet rotor (e.g., rotor 10 with reference by way of example to FIG. 3). As the permanent magnet rotor turns toward the coils of the energized phase, the electronic switch controller may switch that phase off and activate the next adjacent phase, further motivating the rotor to turn. This process may be iterated, in some cases rapidly and continuously, thus accelerating the rotor to a rotational velocity that may be constant. The rotation of the motor therefore can depend in part on the speed at which the electronic switch controller can switch between phases, for example, phases (25a, 25b, 25c shown by way of example in FIG. 4A).

The winding configuration of bottom winding section 25 may in some cases be identical or substantially similar to the winding configuration of the middle winding section 30. In example embodiments, bottom and middle winding sections 25 and 30 may include three phases, with each phase including windings of four coils wrapped around the motor armatures. Referring back to FIG. 3, middle winding section 30 may consist of wire of a relatively larger gauge and have a relatively lesser number of windings around each of the armatures than, for example the bottom winding section 25. As such, the wire properties and the winding arrangement of the middle winding section 30 may provide for a higher $K_v$ than, for example, bottom winding section 25, even though winding sections 25 and 30 may share an at least similar winding configuration around the motor armatures. With a higher $K_v$, middle winding section 30 may be able to achieve higher speeds than bottom winding section 25, but may in some cases have diminished torque capacity.

Figure 4B:
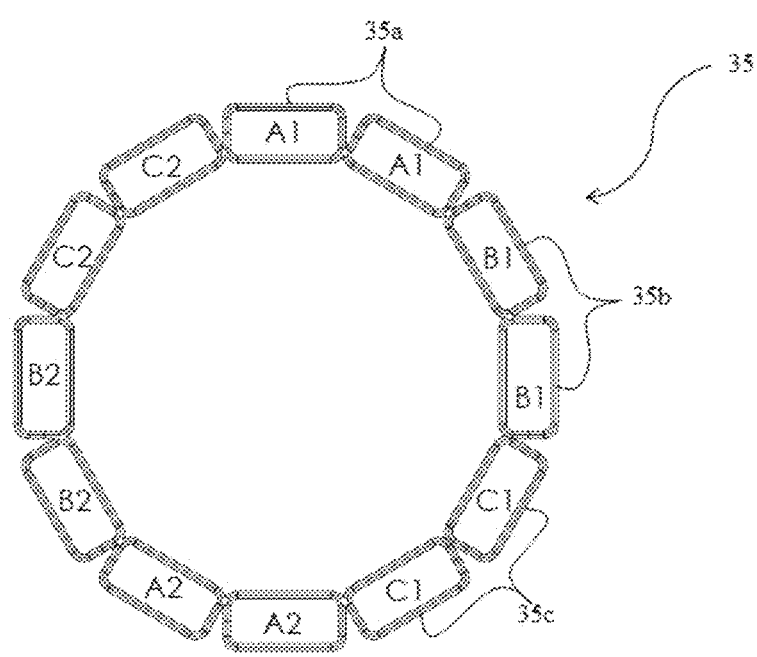
FIG. 4B depicts an example winding configuration of a top winding section in connection with embodiments of the present disclosure.

FIG. 4B depicts an example implementation of a winding configuration that may be used for the top winding section 35 in accordance with embodiments of the present disclosure. As described above, in the winding sections of the bottom winding section 25 and middle winding section 30 depicted in FIG. 4A, each phase may include four coils which are individually wrapped around each of the armatures. Top winding section 35 may likewise have three phases, 35a, 35b, and 35c. Each of phases 35a, 35b, and 35c may have two effective coils, which may be formed by connecting the windings of adjacent armatures in pairs. For example, phase 35a may include windings A1 and A2, where both A1 and A2 are formed by a connection (e.g., an uninterrupted connection) between the windings of a pair of adjacent armatures. The pair of connected, adjacent windings may be wound in the same direction in order to exhibit similar electromagnetic field properties. One benefit of this configuration is that the effective $K_v$ of winding section 35 may be improved, for example because the number of switches between phases per revolution made by the electronic switch controller associated with winding section 35 may be reduced relative to the switch control for the bottom and middle winding sections (e.g., 25 and 30, with reference by way of example to FIG. 3).

Referring again, by way of example, to bottom winding section 25 shown in FIG. 4A, in order for the rotor (e.g., rotor 10) to complete one revolution, the electronic switch controller may need to cycle through each of phases 25a, 25b, 25c four times. The four coils (e.g., A1-A4) of phases 25a, 25b, 25c may each be wrapped around an individual armature. Thus, the electronic switch controller may need to switch twelve times in order for the rotor to make one revolution. Generally, the time associated with one revolution of a motor may be limited by the time it takes for the electronic switch controller to make the number of switches that may be needed for one revolution (e.g., 12 switches in this particular instance).

Middle winding section 30 and the associated configuration may have similar properties, because, as mentioned middle winding section 30 may use a similar winding configuration as bottom winding section 25. For example, while middle winding section 30 may in some cases use wire of a larger gauge and/or may have less windings around each armature, embodiments of winding section 30 may still utilize three phases with four coils per phase. In the top winding section depicted in FIG. 4B, however, coils of adjacent armatures are connected together to form pairs of connected coils.

Top winding section 35 may include a similar number of phases (e.g., three phases 35a, 35b, 35c, referencing FIG. 4B by way of example) vis-à-vis bottom and/or middle winding sections 25 and/or 30. Nevertheless, in embodiments, each phase 35a, 35b, 35c may include a different number of effective groups of coils vis-à-vis bottom and/or middle winding sections 25 and/or 30. For example, two effective groups of coils (e.g., A1, A2) may be used (referencing FIG. 4B) in conjunction with top winding section 35. In some such embodiments, connecting the windings of adjacent armatures may enable the electronic switch controller to make fewer switches per revolution, thus increasing the speed capacity of the motor.

Figure 4C:
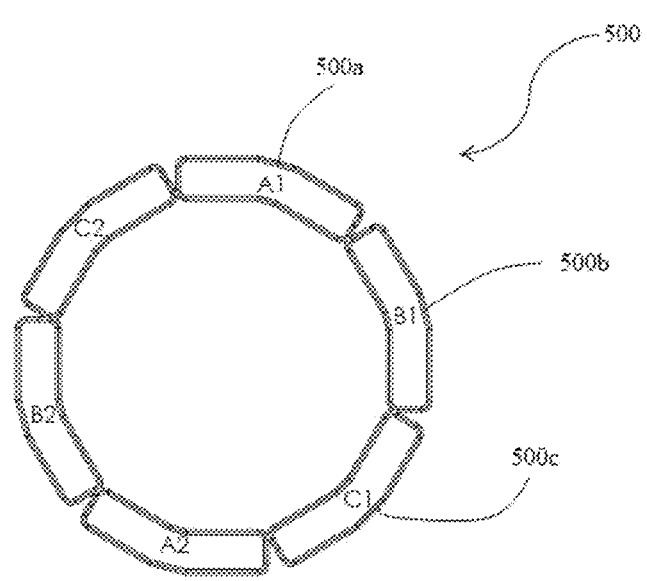
FIG. 4C depicts an example winding configuration of a top winding section in connection with embodiments of the present disclosure.

The connection of (e.g., adjacent) coils according to embodiments of the present disclosure is further illustrated in FIG. 4C. As shown in FIG. 4C, in embodiments, rather than connecting individual armature windings in pairs (e.g., as shown in FIG. 4B), the windings may be physically wrapped around adjacent armatures. The winding configurations shown FIG. 4C may be subject to the switching speed/frequency of the electronic switch controller, as described in connection with FIG. 4B, because both configurations to some extent utilize a number switches per revolution. Nevertheless, the winding configuration of FIG. 4B may in some cases utilize more magnetic flux, for example, because the windings may be wrapped substantially (and/or entirely) around each of the armatures, thus reducing gaps between the armatures.

Figure 5A:
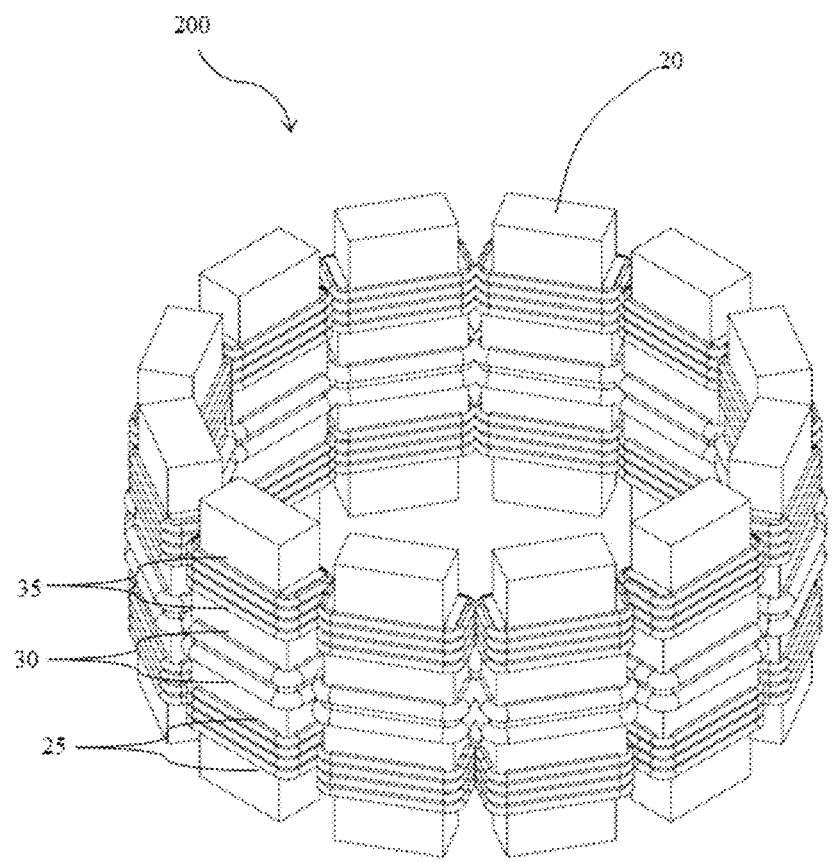
FIG. 5A depicts an example motor and armatures in connection with embodiments of the present disclosure.

FIG. 5A is an example embodiment of the disclosure 200 depicting the separately terminable winding sections and the motor armatures isolated from the rotor and stator assembly. The separate winding sections, 25, 30, and 35, may be wound around the motor armatures 20. The bottom winding section 25 and middle winding section 30 may be configured in a winding configuration described above with reference to FIG. 4A. The top winding section 35 may be configured in a winding configuration described above with reference to FIG. 4B.

Figure 5B:
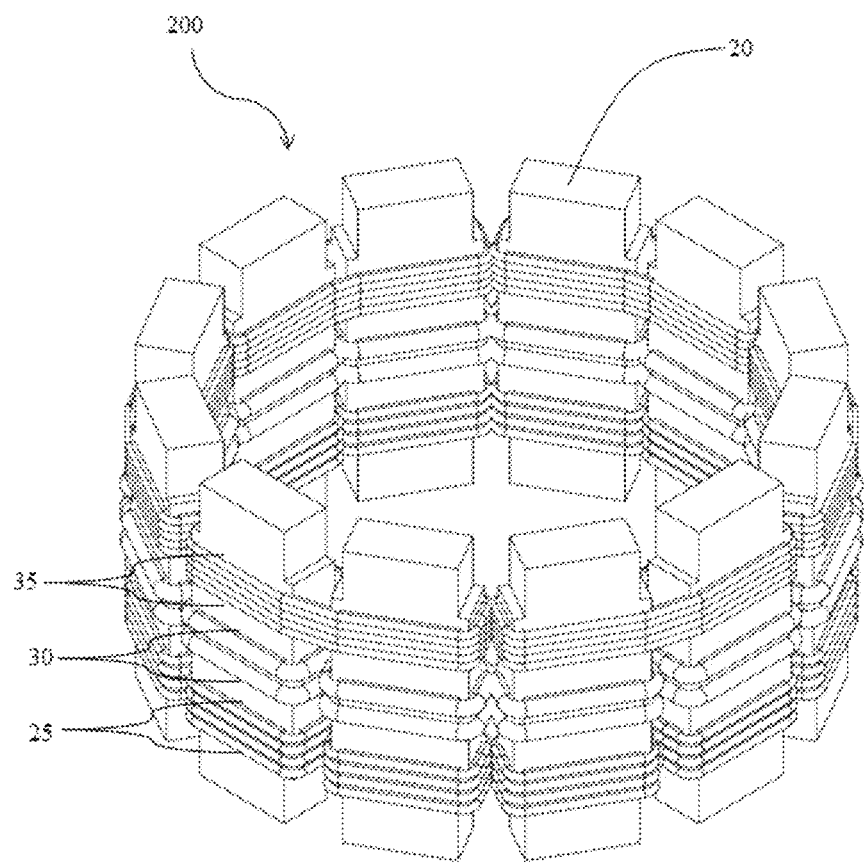
FIG. 5B depicts an example motor and armatures in connection with embodiments of the present disclosure.

FIG. 5B illustrates another embodiment of the disclosure. Referring to FIG. 5B, separately terminable winding sections and motor armatures may be isolated from the rotor and stator assembly. The separate winding sections, 25, 30, and 35, may be wound around the motor armatures 20. The bottom winding section 25 and middle winding section 30 may be configured in a winding configuration as described above with reference to FIG. 4A. The top winding section 35 may be configured in the winding configuration as described above with reference to FIG. 4C.

Figure 6:
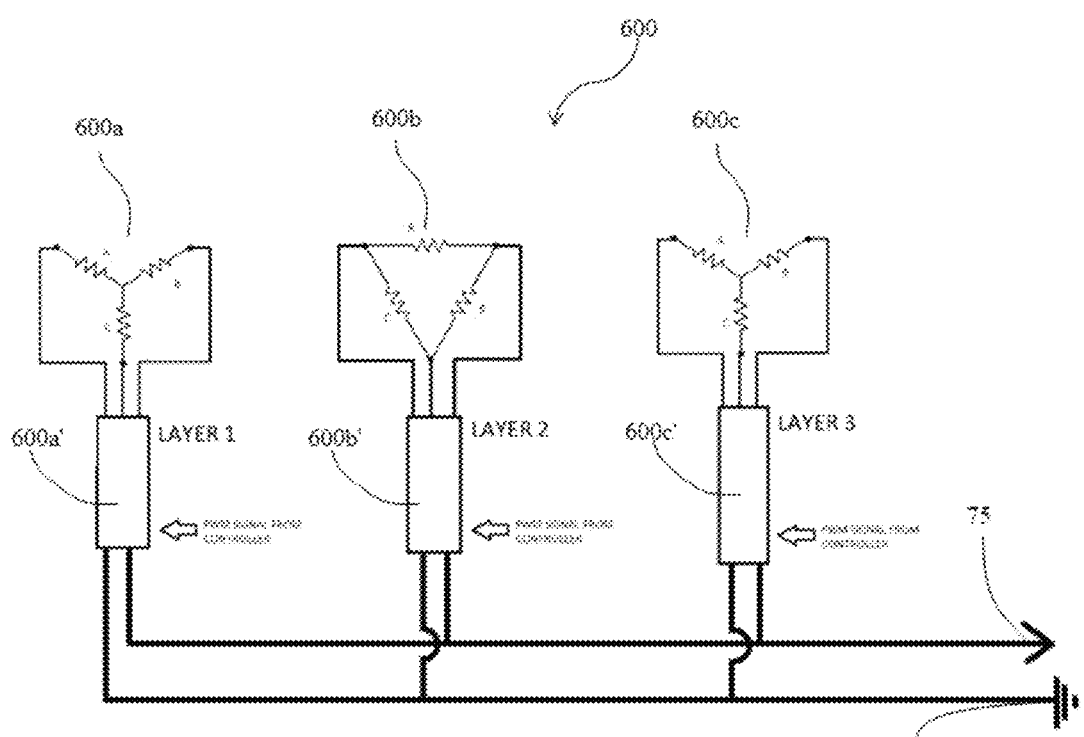
FIG. 6 is a diagram depicting example circuitry and electronic switch controllers for winding sections in connection with embodiments of the present disclosure.

FIG. 6 illustrates an example electrical winding configuration 600 with three separately terminable winding sections. Each separately terminable winding section may be connected to a separate electronic switch controller. The electronic switch controllers may be connected to a common ground 70. As illustrated, the bottom winding section 600a may be connected to the electronic switch controller 600a'; the middle winding section 600b may be connected to the electronic switch controller 600b'; and the top winding section 600c may be connected to the electronic switch controller 600c'. Connecting each of the winding sections to a separate electronic switch controller allows for added versatility in selecting different speed controllers for each winding section based on the desired performance of each separate winding section. The electronic switch controllers may receive power from power source 75. In some examples, each winding section receives power from a separate power supply.

Within each separate winding section, the three phases may be electrically configured in wye or delta electrical winding configurations. For example, as illustrated in FIG. 6, bottom winding section 600a and top winding section 600c may be configured in a wye configuration and middle winding section 600b may be configured in a delta configuration. Alternate configurations for each winding section (e.g., wye or delta) may be used as would be known in the art. Wye configurations may supply higher torque, but lower speeds, whereas delta configurations may supply lower torque, but higher speeds. The ability to switch between the configurations, in addition to switching the number of windings in each configuration as described with respect to FIGS. 4A-5C, enables control over the desired motor outputs with respect to torque and speed, similar to switching gears on a bicycle or car.

Various embodiments of the disclosure may employ different numbers of armatures and winding patterns, with various configurations and numbers of separate winding sections in any orientation, and any configuration of connected groups of adjacent armature windings. For example, one example may include a brushless permanent magnet motor with twenty-four armatures and four separate winding sections. The first separate winding section may have three phases, each phase having eight coils around eight individual armatures. The second separate winding section may have three phases, each phase having four coils, with each coil consisting of connected windings of two adjacent armatures. The third separate winding section may have three phases, each phase having two coils, each coil consisting of connected windings of four adjacent armatures. The fourth separate winding section may have three phases, each phase having only one coil, where each coil consists of connected windings of eight adjacent armatures. It will be appreciated, that other numbers of separate winding sections may be employed with different numbers of phases and/or coils. Each separately terminable section may be configured the same or differently, for example, to further have a particular electrical configuration, either delta or wye, a particular number of windings around each armature, a particular wire gauge, and a particular power supply. Each of the electronic switch controllers may be selected based on their switching abilities. It is also possible that a single electronic switch controller activates multiple separate winding sections at once. The present disclosure allows for other possible combinations as would be known in the art.

Embodiments of the disclosure function similarly to a magnetically geared motor because of the ability of the motor to switch between the separate winding sections. The separate winding sections have varying magnetic properties that yield selectable torque and output characteristics. The process of switching between the separate winding sections may be automatic (e.g., controlled by sensors used to detect motor output, speed of the vehicle, etc.) or manual.

Figure 7:
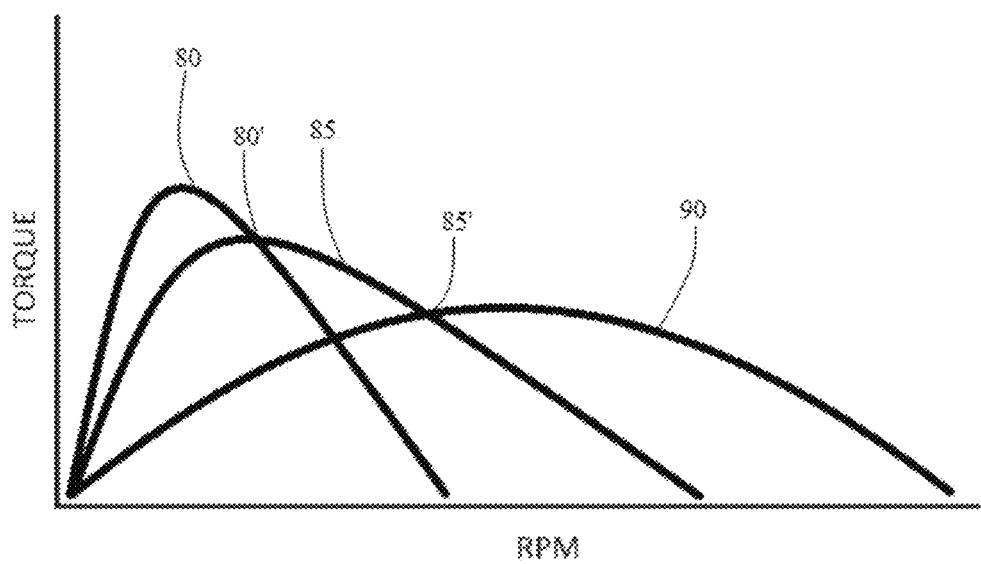
FIG. 7 is an example graph of motor torque versus motor speed versus for winding sections in connection with embodiments of the present disclosure.

FIG. 7 is a graph illustrating example torque and speed characteristics of a motor following selection of different winding sections and configurations of an example embodiment of the disclosure. For example, plot 80 may represent torque and speed characteristics of the motor when the bottom winding section is activated. A possible desired time to switch between the bottom winding section and middle winding section 85 may be represented by the intersection point of the with plot 80'. Likewise, a possible desired time to switch between middle winding 85 section and top winding section 90 may be at the intersection point with plot 85'. By measuring the rotations per minute (RPM) of the motor using a Hall-effect sensor, tachometer, or other sensor as known in the art, programmed circuitry may automatically "change gears" by switching between winding sections. Transitions between the separate winding sections may also be manually controlled. There is no requirement that the winding sections be switched in any particular order. In some examples, aspects of the motor may be configured to function as a "brake," and this may be done in some embodiments using a particular winding configurations. For example, one or more of the winding sections may be configured to achieve torque outputs in a direction opposite to the normal operating torque of the motor. Such winding sections may be inactive during the normal use motor, but may be activated to counter the motion of rotor to brake, slow down, or stop the rotor, depending on the level of the torque output applied by the winding section(s).

Other winding properties that may be selected to adjust the characteristics of the motor may include wire gauge, number of winding around the armatures, number of connected adjacent armatures, electronic controllers, and/or power supplies. Multiple winding sections may be operated simultaneously, or in various combinations, to achieve various desired results.

Using windings that are separately terminable may improve transition between different winding sections. For example, electric motors that enable switching between multiple winding configurations tend to experience a temporary inactivity during the switching state. Embodiments disclosed herein include electronic switch controllers (e.g., as illustrated in FIG. 6) which may be capable of pulse width modulation. If a user desires to switch from the middle winding section to the top winding section, the electronic switch controller may slowly ramp up the top winding section to prepare it to be fully activated. Once the switch from the middle winding section to the top winding section is made, the middle winding section may be slowly ramped down, rather than completely turned off. The ability to separately control the power of each winding section through pulse-width modulation may improve seamless switching sequences to mitigate the "jerking" effect associated with switching gears.

Various embodiments have been described with reference to specific example features thereof. It will be evident to one of ordinary skill in the art that various modifications and changes may be made to those embodiments without departing from the broader spirit and scope of the disclosure. The specification and figures are illustrative and should not be construed to limit or restrict the scope of the disclosure or the claims.

Moreover, although described above in terms of various example embodiments and implementations, it would be understood that the various features, aspects, and functionality described in one or more of the individual embodiments are not limited in their applicability to the particular embodiment with which they are described, but instead may be applied, alone or in various combinations, to one or more of the other embodiments of the present application, whether or not such embodiments are described and whether or not such features are presented as being a part of a described embodiment. Thus, the breadth and scope of the present application should not be limited by any of the above-described example embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide illustrative instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of example block diagrams, flow charts, and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration. Also, one of ordinary skill in the art will recognize, upon studying the present disclosure, how teachings in any one of the figures herein may be applied to any of the other figures herein.

What is claimed is:

1. A brushless direct current motor, comprising:
   multiple armatures mounted to a stator;
   and multiple separately terminable winding sections, wherein each of the separately terminable winding sections comprises a plurality of coils, wherein each coil is wrapped around at least one of the armatures, wherein at least one of the separately terminable winding sections comprises a plurality of coils each wrapped around at least two of the armatures, wherein the at least two of the armatures are adjacent to one another.

2. The motor of claim 1, wherein the separately terminable winding sections comprise enameled copper wire.

3. The motor of claim 1, wherein at least a first separately terminable winding section of the multiple separately terminable winding sections comprises wire of a first gauge size, wherein a second separately terminable winding section of the multiple separately terminable winding sections comprises wire of a second gauge size, and wherein the first gauge size is different than the second gauge size.

4. The motor of claim 1, further comprising a rotor positioned relative to the separately terminable winding sections such that the rotor interacts with magnetic fields generated by the separately terminable winding sections, wherein the rotor comprises multiple permanent magnets of a different polarities, wherein the permanent magnets are positioned around a perimeter of the rotor in alternating polarities.

5. The motor of claim 4, wherein the rotor is positioned in an outrunner configuration relative to the separately terminable windings.

6. The motor of claim 4, wherein at the rotor is positioned in an inrunner configuration relative to the separately terminable windings.

7. The motor of claim 1, further comprising a voltage source electrically coupled to the separately terminable winding sections through an electronic switch.

8. The motor of claim 7, wherein the voltage source is configured to provide variable voltage to at least one the separately terminable winding sections.

9. The motor of claim 7, wherein the voltage source is configured to ramp down the voltage of an activated winding section of at least one of the separately terminable winding sections before another winding section of the separately terminable winding sections is activated.

10. The motor of claim 7, where the voltage source is configured to ramp down a voltage of a first activated winding section of at least one of the separately terminable winding sections while a second voltage source ramps up a voltage of a second activated winding section of at least one of the separately terminable winding sections.

11. The motor of claim 1, wherein two of the separately terminable winding sections are coupled to a common voltage source.

12. The motor of claim 1, wherein a first separately terminable winding section of the separately terminable winding section is electronically coupled to a first voltage source and a second separately terminable winding of the separately terminable winding sections is electronically coupled to a second voltage source.

13. The motor of claim 1, further comprising a pulse-width modulation circuit coupled to at least one of the separately terminable winding sections.

14. The motor of claim 1, wherein at least one of the separately terminable winding sections is wrapped vertically around a corresponding armature of the multiple armatures.

15. The motor of claim 1, wherein at least two of the multiple separately terminable winding sections are coupled to a separate electronic switch controller.

16. The motor of claim 1, wherein at least one of the separately terminable winding sections is configured in a wye circuit configuration.

17. The motor of claim 1, wherein at least one of the separately terminable winding sections is configured in a delta circuit configuration.

18. A method of operating a brushless direct current motor, the method comprising:
mounting armatures to a stator;
wrapping separately terminable winding sections around the armatures to form a plurality of coils, wherein each coil of at least one of the separately terminable winding sections comprises windings wrapped around two or more adjacent armatures;
connecting each electronic switch device of multiple electronic switch devices to at least one of the separately terminable winding sections and to a power source;
activating at least two of the separately terminable winding sections.

19. A system for magnetically changing gears in a brushless direct current motor, the system comprising:
multiple armatures mounted to a stator;
multiple separately terminable winding sections wrapped around the armatures, wherein each of the separately terminable winding sections comprises a plurality of coils each wrapped around at least one of the armatures, wherein at least one of the separately terminable winding sections comprises a plurality of coils, each wrapped around at least two of the armatures, wherein the at least two of the armatures are adjacent to one another;
an electronic switch device connected to at least one of the separately terminable winding sections;
a power source connected to the electronic switch device;
wherein the power source and the electronic switch device are adapted to generate a first output velocity and a first output torque by controlling an amount of power delivered to a first combination of one or more of the multiple separately terminable winding sections; and
wherein the power source and the electronic switch device are adapted to generate a second output velocity and a second output torque by controlling an amount of power delivered to a second combination of one or more of the multiple separately terminable winding sections, wherein the second combination is different than the first combination.

20. The system of claim 19, wherein the power source and the electronic switch device are further adapted to control the amount of power delivered to one or more of the first combination and the second combination by increasing, as a function of time, a voltage supplied to the first combination or the second combination, or decreasing, as a function of time, the voltage supplied to the first combination or the second combination.

* * * * *